United States Patent [19]
Nakajima et al.

[11] Patent Number: 5,383,229
[45] Date of Patent: Jan. 17, 1995

[54] FUEL ASSEMBLY AND REACTOR CORE

[75] Inventors: Akinobu Nakajima, Hitachi; Yoko Ishibashi, Hitachiohta; Motoo Aoyama, Mito; Kunitoshi Kurihara, Katsuta; Junichi Yamashita, Hitachi; Junjiro Nakajima, Hitachi; Koji Nishida, Hitachi, all of Japan

[73] Assignee: Hitachi, Ltd., Tokyo, Japan

[21] Appl. No.: 879

[22] Filed: Jan. 5, 1993

[30] Foreign Application Priority Data

Jan. 8, 1992 [JP] Japan .................................. 4-001515

[51] Int. Cl.$^6$ .............................................. G21C 3/32
[52] U.S. Cl. .................................. 376/434; 376/438; 376/349
[58] Field of Search ................ 376/349, 414, 419, 434, 376/435, 438, 441, 442, 443

[56] References Cited

U.S. PATENT DOCUMENTS

| | | | |
|---|---|---|---|
| 4,708,845 | 11/1987 | Mildrum et al. | 376/435 |
| 4,926,450 | 5/1990 | Masuhara et al. | 376/444 |
| 5,128,097 | 7/1992 | Fukasawa et al. | 376/438 |

FOREIGN PATENT DOCUMENTS

| | | |
|---|---|---|
| 529792 | 1/1977 | Japan . |
| 58-14080 | 1/1983 | Japan . |
| 58-129385 | 8/1983 | Japan . |
| 59-132389 | 7/1984 | Japan . |
| 1308994 | 12/1989 | Japan . |

Primary Examiner—Donald P. Walsh
Assistant Examiner—Frederick H. Voss
Attorney, Agent, or Firm—Antonelli, Terry, Stout & Kraus

[57] ABSTRACT

A second fuel rod positioned at each corner of a channel box and second fuel rods adjacent to the former are formed to have a smaller outer diameter than that of ordinary first fuel rods, so that a pitch between the second fuel rods is narrower than a pitch between the first fuel rods. Making the outer diameter of the second fuel rods smaller than that of the first fuel rods reduces the power per unit length of the second fuel rods. The narrower pitch between the second fuel rods than the pitch between the first fuel rods provides two effects. First, a unit lattice cell becomes so small as to avoid an increase in the H/U ratio. Secondly, a new moderator region is formed between the second fuel rods and the first fuel rods adjacent thereto, the moderator region acting to intensify thermal neutron flux around those first fuel rods. These two effects enable a further reduction in the power per unit length of the second fuel rods. As a result, a fuel assembly intended for higher burn-up can be realized by increasing enrichment, while suppressing an increase in the local power peaking factor at corners of the fuel assembly.

10 Claims, 12 Drawing Sheets

FUEL ASSEMBLY AND REACTOR CORE

BACKGROUND OF THE INVENTION

The present invention relates to a fuel assembly loaded in a boiling water reactor and a reactor core containing such a fuel assembly, and more particularly to a fuel assembly and a reactor core which contribute to achievement of higher burn-up and an improvement in fuel economy.

In existent boiling water reactors, a fuel assembly is built up in such a manner that a fuel rod group (fuel bundle) is constituted by a number of fuel rods arrayed in a square lattice pattern and containing nuclear fuel material and at least one moderator rod containing no nuclear fuel materials, and a channel box is arranged to surround the fuel rod group. The presence of the channel box defines a coolant path passing the fuel rod group inside the channel box and a coolant path outside the channel box. Light water as a coolant and a moderator flows through those paths. The light water flowing through the inside of the channel box boils, but the light water flowing through the outside of the channel box does not boil. Accordingly, the fuel rods making up the fuel assembly are subjected to different profiles of moderator distribution depending on whether they are located near to or far from the channel box.

Recently, raising burn-up of a fuel assembly has been attempted from the standpoints of effectively utilizing uranium resource and reducing the amount of spent fuel generated. For this purpose, it is required to increase mean fuel enrichment of a fuel assembly. With fuel enrichment of fuel rods increasing, however, a number density of fuel material is increased, hence a fission cross section is enlarged. At corners of a channel box including a fuel assembly, because neutrons produced by nuclear fission are effectively moderated with light water, that flows outside the channel box surrounding fuel rods, to become thermal neutron flux, the thermal neutron flux is intensified around the fuel rods near the channel box corners. As a combined result of the above effects, those fuel rods which are arranged at the corners of the channel box including the fuel assembly exhibit higher power and a higher local power peaking factor so that a thermal design margin decreases.

As one prior art for solving the above-mentioned problem, it has been proposed to make an outer diameter of the fuel rods arranged at the channel box corners smaller than that of other fuel rods, thereby suppressing an increase in the fission cross section due to greater enrichment, lowering the power per unit length of the fuel rods arranged at the channel box corners, and reducing their local power peaking factor (see JP, A,52-9792 and JP, A, 58-129385, for example: this prior art will be hereinafter referred to as the first prior art). As another prior art, it has also been proposed to provide a central region where a plurality of fuel rods are arranged in a square lattice pattern and a peripheral region in which a plurality of fuel rods are arranged in a triangular lattice pattern and which surrounds the central region, and to increase a diameter of some fuel rods correspondingly to an increase in distance between those fuel rods and the channel box resulted from the presence of the triangular lattice pattern, thereby increasing the power of those fuel rods, lowering a share of the power to be borne by the fuel rods arranged at the channel box corners, and reducing their local power peaking factor (see JP, A,1-308994: this prior art will be hereinafter referred to as the second prior art).

SUMMARY OF THE INVENTION

Any of the above-mentioned first and second prior arts is to adjust a mass of fuel material (i.e., a microscopic fission cross section of fuel) and a ratio of fuel to moderator (i.e., an H/U ratio, namely, a ratio of the number of hydrogen atoms to the number of uranium atoms) so that the local power peaking factor will not become too high.

However, the first prior art is still problematic in that although enrichment can be increased as the result of reducing the nuclear fuel mass arranged at the channel box corners, a plurality of other ordinary fuel rods near the channel box corners may exhibit a high local power peaking factor in the case of attempting to further increase the enrichment. To suppress such a high local power peaking factor, it would be conceivable to adopt those fuel rods, which have a smaller outer diameter than that of ordinary fuel rods, also as a plurality of the fuel rods near the channel box corners. But, since simply reducing an outer diameter of fuel rods increases a moderator region around those fuel rods, the H/U ratio is increased and the effect of reducing the power of those fuel rods is suppressed.

Also, the possibility exists in the second prior art that a plurality of ordinary fuel rods near the channel box corners may exhibit a high local power peaking factor in the case of attempting to further increase the enrichment.

An object of the present invention is to provide a fuel assembly which enables a further increase in enrichment and permits higher burn-up, while suppressing a local power peaking factor, and a reactor core containing such a fuel assembly.

To achieve the above object, in accordance with the present invention, there is provided a fuel assembly comprising a plurality of first fuel rods arrayed in a square lattice pattern and containing nuclear fuel material, and at least one moderator rod containing no nuclear fuel materials, wherein said fuel assembly further comprises a plurality of second fuel rods having a smaller outer diameter than an outer diameter of said first fuel rods, said second fuel rods are arranged at corners of an outermost layer of the fuel rod array and at positions adjacent to the corners of said outermost layer, and a pitch between said second fuel rods is narrower than a pitch between said first fuel rods.

With the present invention thus arranged, by making the outer diameter of the second fuel rods smaller than that of the first fuel rods, the power per unit length of the second fuel rods can be reduced. Also, by making the pitch between the second fuel rods smaller than the pitch between the first fuel rods, the power per unit length of the second fuel rods can be further reduced through two effects. First, a unit lattice cell defined by each second fuel rod and a moderator surrounding it becomes smaller than a unit lattice cell defined by each first fuel rod and a moderator surrounding it, thereby avoiding an increase in the H/U ratio. Secondly, a new moderator region is formed between the second fuel rods and the first fuel rods adjacent thereto, the moderator region acting to intensify thermal neutron flux around those first fuel rods and increase the power. As a result, a fuel assembly intended for higher burn-up can be realized by increasing enrichment, while suppressing an increase in the local power peaking factor at corners of the fuel assembly.

In the above fuel assembly, preferably, a pitch between those ones of the second fuel rods arranged at positions adjacent to the corners of the aforesaid outermost layer and the first fuel rods arranged in the aforesaid outermost layer adjacently to those second fuel rods is wider than the pitch between the first fuel rods. Also preferably, a spacing between outer circumferential surfaces of the second fuel rods is almost equal to a spacing between outer circumferential surfaces of the first fuel rods.

In the above fuel assembly, preferably, a plurality of the first fuel rods include a plurality of ordinary fuel rods and a plurality of partial length fuel rods having a shorter fuel effective length than that of the ordinary fuel rods, and the partial length fuel rods are arranged at corners of an layer Just inwardly of the aforesaid outermost layer.

In the above fuel assembly, preferably, of the second fuel rods arranged at the corners of the aforesaid outermost layer of the fuel rod array and at the positions adjacent to the corners of the aforesaid outermost layer, an outer diameter of and a pitch between those second fuel rods arranged at a particular corner and positions adjacent to the particular corner are smaller than an outer diameter of and a pitch between those second fuel rods arranged at other corners and positions adjacent to these other corners. In this case, more preferably, the fuel assembly further comprises a channel box enclosing the first and second fuel rods and the moderator rod, and corners of the channel box adjacent to the aforesaid other corners have a smaller curvature than that of a corner of the channel box adjacent to the aforesaid particular corner. Additionally, when the fuel assembly is loaded in a core of the type that a control rod is inserted adjacently to the fuel assembly, the aforesaid particular corner is positioned on the side where the control rod is inserted.

Further, to achieve the above object, in accordance with the present invention, there is provided a reactor core containing a plurality of fuel assemblies, wherein at least one of the plural fuel assemblies is the above-mentioned fuel assembly.

DETAILED DESCRIPTION OF THE PREFERRED EMBODIMENTS

Hereinafter, preferred embodiments of the present invention will be described.

Figure 1:
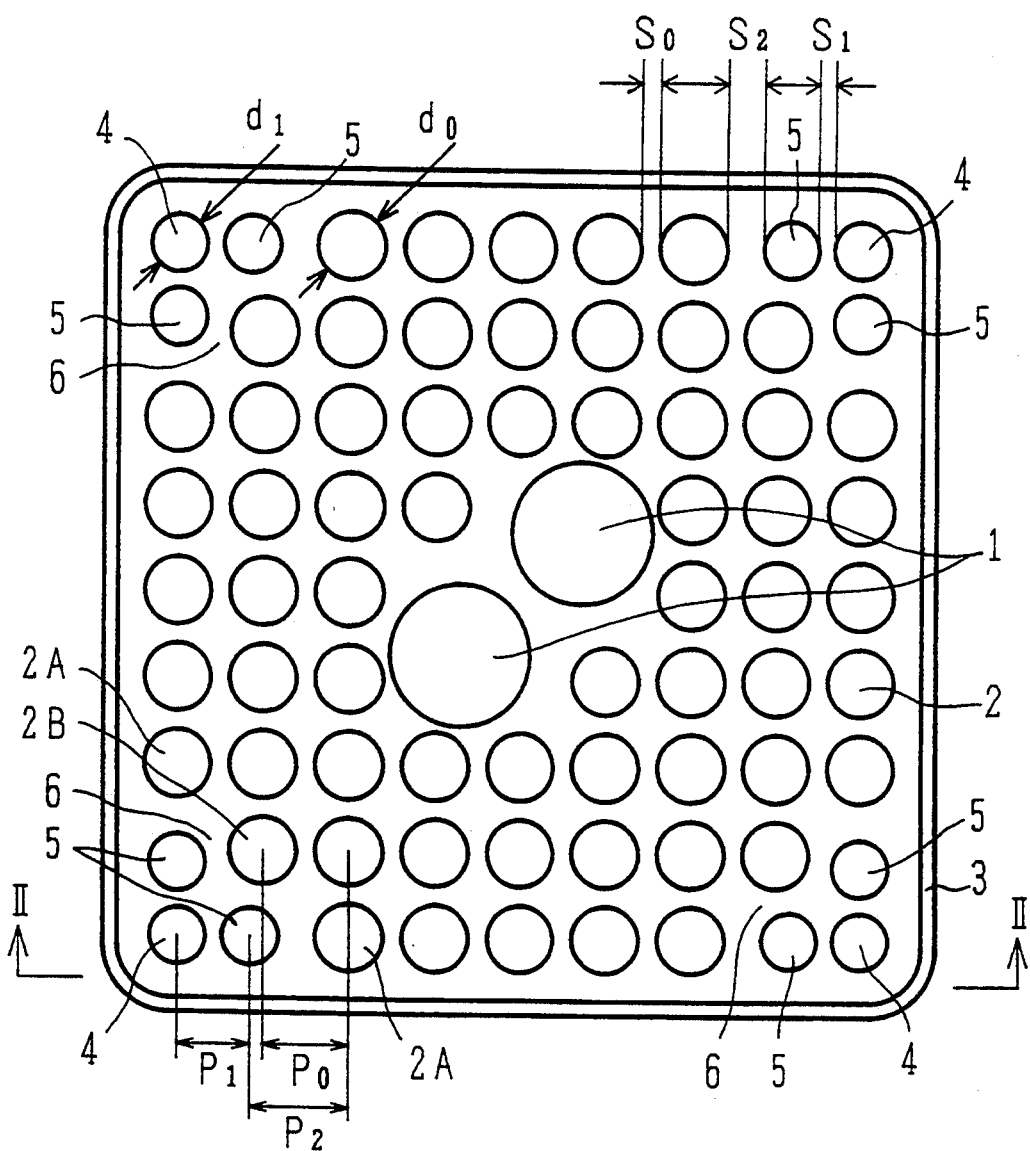
FIG. 1 is a horizontal sectional view of a fuel assembly according to a first embodiment of the present invention.

FIG. 1 shows a horizontal sectional of a fuel assembly according to a first embodiment of the present invention. The fuel assembly comprises two large-size water rods 1 arranged at the center, a number of first fuel rods 2 arrayed in a square lattice pattern around the water rods 1, and second fuel rods 4, 5 having a smaller outer diameter than that of the first fuel rods 2. The water rods 1 and the first and second fuel rods 2, 4, 5 are enclosed by a channel box 3 which is rectangular in cross-section. Of the second fuel rods 4, 5, the fuel rods 4 are each arranged at a corner of the channel box 3 in opposite relation, and the fuel rods 5 are arranged adjacent to the fuel rods 4. Assuming that the first fuel rods 2 have an outer diameter $d_0$ and the second fuel rods 4, 5 have an outer diameter $d_1$, the relationship of $d_1 < d_0$ holds. More specifically, the fuel rods 4 are positioned at the corners of the square lattice array of the first fuel rods 2, and the fuel rods 5 are positioned slightly offset toward the fuel rods 4 from unit cell positions of the square lattice array of the first fuel rods 2 such that a pitch $P_1$ between each fuel rod 4 and two fuel rods 5, 5 adjacent to the former is narrower than a pitch $P_0$ between adjacent twos of the first fuel rods 2 (i.e., $P_1 < P_0$). Further, denoting by 2A those ones of the first fuel rods 2 which are positioned in an outermost layer of the fuel rod array and adjacent to the two fuel rods 5, 5 on the side opposite to each fuel rod 4, a pitch $P_2$ between the fuel rods 5, 5 and the first fuel rods 2A is larger than the pitch $P_0$ between adjacent twos of the first fuel rods 2 (i.e., $P_0 < P_2$). Thus, the relationship of $P_1 < P_0 < P_2$ holds. Denoting by 2B those ones of the first fuel rods 2 which are positioned at corners of a layer just inside the outermost layer of the fuel rod array, a spacing $S_1$ between the outer circumferential surface of the second fuel rod 4 and the outer circumferential surface of the second fuel rod 5 is almost equal to a spacing $S_0$ between the outer circumferential surfaces of adjacent twos of the first fuel rods 2. A spacing $S_2$ between the outer circumferential surface of the second fuel rod 5 and the outer circumferential surface of the first fuel rod 2A is larger than the spacings $S_0$, $S_1$. Thus, the relationship of $S_1 = S_0 < S_2$ holds. As a result, the area of a moderator region (or a path through which a coolant flows) between the three fuel rods 4, 5 at each corner and the first fuel rods 2A, 2B adjacent to the former becomes greater than the area of a moderator region between adjacent twos of the first fuel rods 2, whereby a new moderator region. 6 is formed between the second fuel rods 4, 5 and the first fuel rods 2A, 2B.

Figure 2:
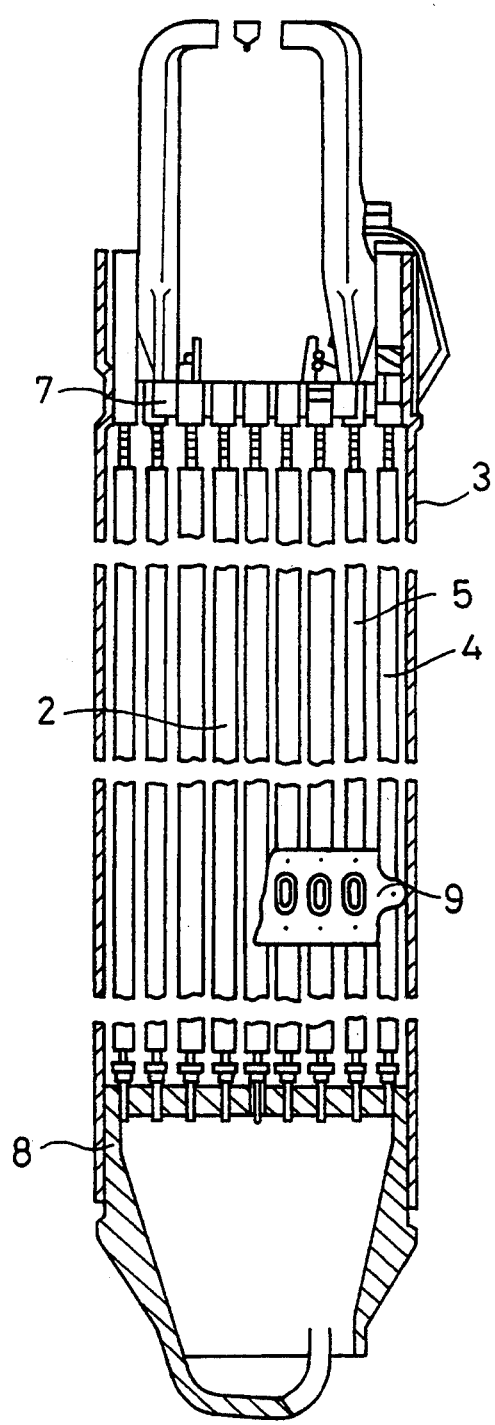
FIG. 2 is a sectional view, taken along line II—II, of the fuel assembly shown in FIG. 1.

FIG. 2 shows the entire construction of the above explained fuel assembly. The water rods (not shown in FIG. 2) and the fuel rods 2, 4, 5 are supported by an upper tie plate 7 and a lower tie plate 8, and are held together by spacers 9 at plural points in their intermediate portions. The channel box 3 encloses the whole of a fuel bundle made up in that way.

In this embodiment thus arranged, by setting the relationship of $d_1 < d_0$ on a condition that the fuel assembly is constructed as described above by fabricating the first fuel rods 2 and the second fuel rods 4, 5 using fuel pellets with the same density and the same enrichment, the power per unit length of the second fuel rods 4, 5 at the corners of the fuel assembly can be reduced.

Further, in this embodiment, the power per unit length of the second fuel rods 4, 5 can be further reduced because the pitch $P_1$ of the second fuel rods 4, 5 is set to be smaller than the pitch $P_0$ of the first fuel rods 2. That effect will be described below in detail with reference to FIGS. 3 and 4.

Figure 3:
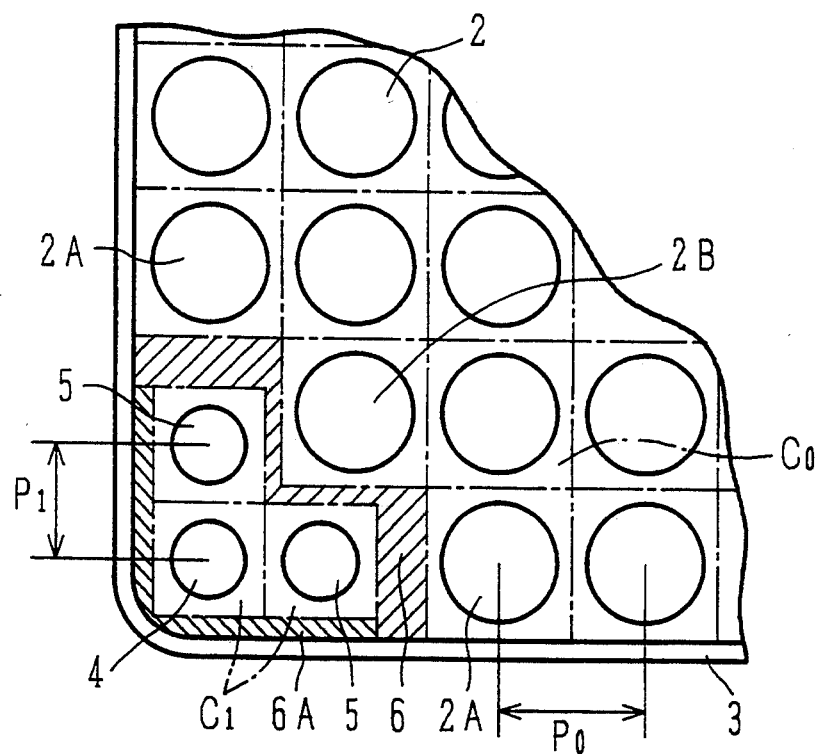
FIG. 3 is a view showing a unit lattice pitch of first fuel rods and a unit lattice pitch of second fuel rods.

In FIG. 3, taking one of the first fuel rods 2 arrayed in a square lattice pattern, a unit lattice cell $C_O$ is formed by the first fuel rod 2 and a moderator region surrounding the same. The unit lattice cell $C_O$ is a square region defined by four straight lines each passing middle points between adjacent twos of the first fuel rods 2. The length of one side of the unit lattice cell $C_O$ is equal to the length of the spacing $P_0$ between the first fuel rods 2. On the other hand, for the second fuel rods 4, 5 arranged at the corners, a unit lattice cell $C_1$ is formed by any one of the second fuel rods 4, 5 and a moderator region surrounding the same. The unit lattice cell $C_1$ is a square region defined by the length of the pitch $P_1$ of the second fuel rods 4, 5, as shown, based on straight lines passing middle points between the second fuel rods 4 and 5. The length of one side of the unit lattice cell $C_1$ is naturally equal to the length of the pitch $P_1$. Here, by making the pitch $P_1$ of the second fuel rods narrower than-the pitch $P_0$ of the first fuel rods 2 as mentioned above, the area of the unit lattice cell $C_1$ for the second fuel rods 4, 5 becomes smaller than the area of the unit lattice cell $C_O$ for the first fuel rods 2. Consequently, a resultant increment of the moderator surrounding the second fuel rods 4, 5 is virtually offset to boundaries between the second fuel rods 4, 5 and the first fuel rods 2A, 2B, so that a new moderator region 6 is formed in those boundaries. Also, another new moderator region 6A is formed between the second fuel rods 4, 5 and the channel box 3.

Figure 4:
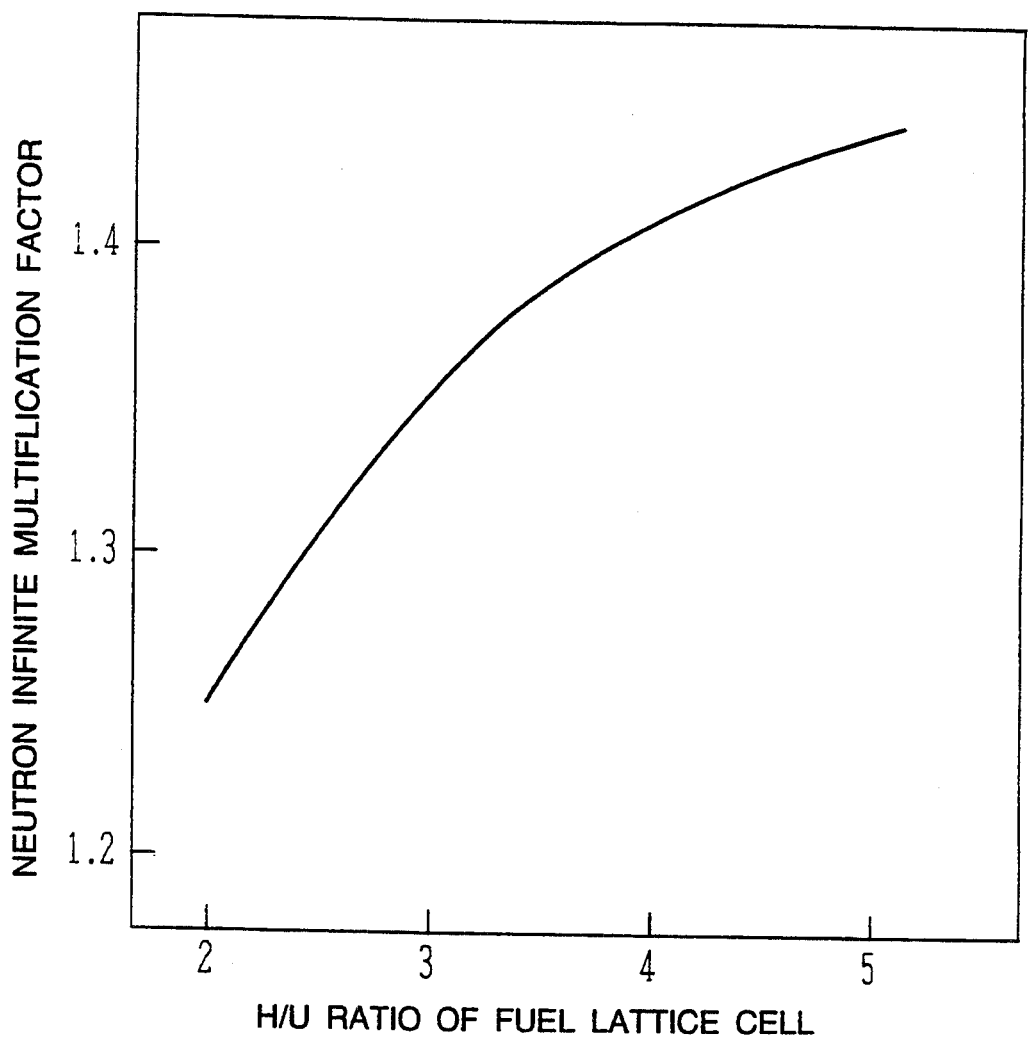
FIG. 4 is a graph showing the relationship between an H/U ratio and a neutron infinite multiplication factor.

Meanwhile, on a condition that the inventory of fuel material contained in a fuel rod, i.e., the microscopic fission cross section of fuel, is the same, the fuel rod produces higher power as the neutron infinite multiplication factor for the fuel rod increases. On the other hand, considering a unit lattice cell defined by a fuel rod and a moderator region surrounding the fuel rod, the neutron infinite multiplication factor in the unit lattice cell depends on the H/U ratio, as shown in FIG. 4. To avoid an increase in the power even with a void fraction increasing in a fuel assembly, usual fuel design employs a range of the H/U ratio illustrated in which as the H/U ratio lowers, the neutron infinite multiplication factor becomes smaller.

Looking now at the second fuel rods 4, 5 arranged at the corners, the second fuel rods 4, 5 contain a smaller amount of uranium, as fuel material, because their outer diameter is reduced. If those second fuel rods 4, 5 were arrayed in a square lattice pattern with the same pitch as that of the first fuel rods 2, the H/U ratio of the unit lattice cell would be raised corresponding to an increase in the moderator region resulted from the reduced outer diameter of the second fuel rods. In this case, although the power of the second fuel rods 4, 5 can be reduced based on the reduced inventory of fuel material (i.e., the fission cross section of fuel), the higher H/U ratio due to the reduced outer diameter of the fuel rods acts to increase the neutron infinite multiplication factor to thereby increase the power of the second fuel rods 4, 5. Therefore, a reduction in the power resulted from reducing the inventory of fuel material contained in the second fuel rods 4, 5 is partially decreased by an increase in the H/U ratio. Stated otherwise, the second fuel rods 4, 5 cannot maximally exhibit the power reducing effect that is obtainable with the reduced inventory of fuel material.

In this embodiment, as explained above, by making the pitch $P_1$ of the second fuel rods narrower than the pitch $P_0$ of the first fuel rods 2, the area of the unit lattice cell $C_1$ for the second fuel rods 4, 5 becomes smaller than the area of the unit lattice cell $C_O$ for the first fuel rods 2. As a result, the H/U ratio of the unit lattice cell $C_1$ for the second fuel rods 4, 5 is n̄ [illegible] and the power of the second fuel rods 4, 5 ca̅ [illegible] duced sufficiently with no possibility that the power reducing effect due to the reduced inventory of fuel material is canceled.

Further, the moderator region 6 is formed between the second fuel rods 4, 5 and the first fuel rods 2A, 2B, as explained above. The moderator region 6 acts to intensify thermal neutron flux around the first fuel rods 2A, 2B which are adjacent to the second fuel rods 4, 5, thus making it possible to increase the power of the first fuel rods 2A, 2B. As a result, on a condition that the total power of the fuel assembly is constant, a share of the power to be borne by the second fuel rods 4, 5 arranged at the corners can be reduced, which enables a further reduction in the power of those fuel rods.

In other words, this embodiment is able to lower the power per unit length of the second fuel rods 4, 5 and reduce their local power peaking factor through two effects; i.e., control of the H/U ratio due to the smaller unit lattice cell $C_1$ resulted by making the pitch $P_1$ of the second fuel rods 4, 5 smaller than the pitch $P_0$ of the first fuel rods 2, and an action of the moderator region 6 upon the first fuel rods 2A, 2B.

According to results of the calculation made by the inventors of this application, on a condition that the first fuel rods 2 and the second fuel rods 4, 5 have the same enrichment, the local power peaking factor of the second fuel rods 4, 5 at the corners can be reduced about 2% by reducing both the outer diameter and the pitch $P_1$ of the second fuel rods 4, 5 in comparison with the fuel assembly that only the outer diameter of the second fuel rods 4, 5 is reduced, but their pitch remains the same. Also, on a condition that the local power peaking factor is held at the same level, mean enrichment of the fuel assembly can be increased about 0.1 W/O. This implies that higher burn-up can be achieved with the increased enrichment.

With this embodiment, therefore, it is possible to realize a fuel assembly intended for higher burn-up since enrichment can be increased while suppressing an increase in the local power peaking factor at corners of the fuel assembly.

Figure 5:
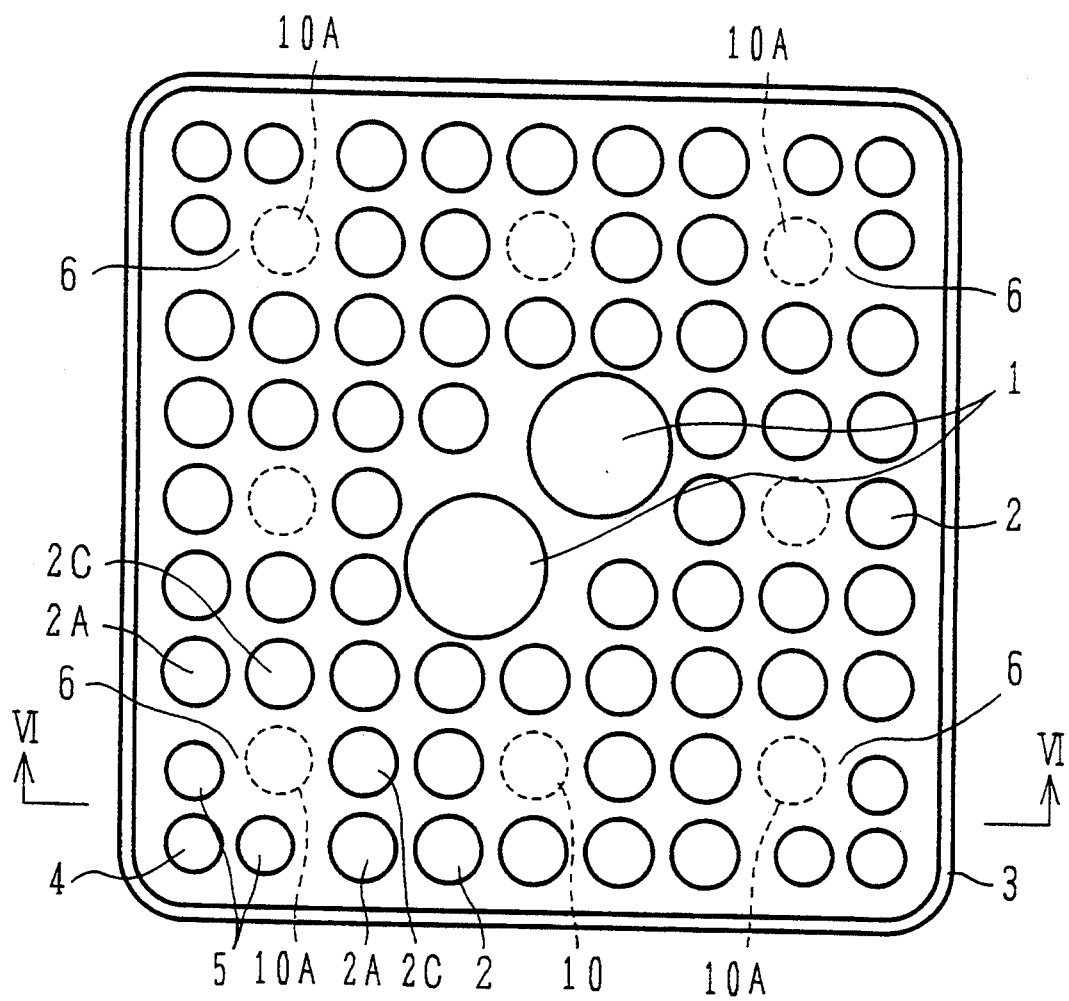
FIG. 5 is a horizontal sectional view, taken along line V—V in FIG. 6, of a fuel assembly which includes partial fuel rods, according to a second embodiment of the present invention.
Figure 6:
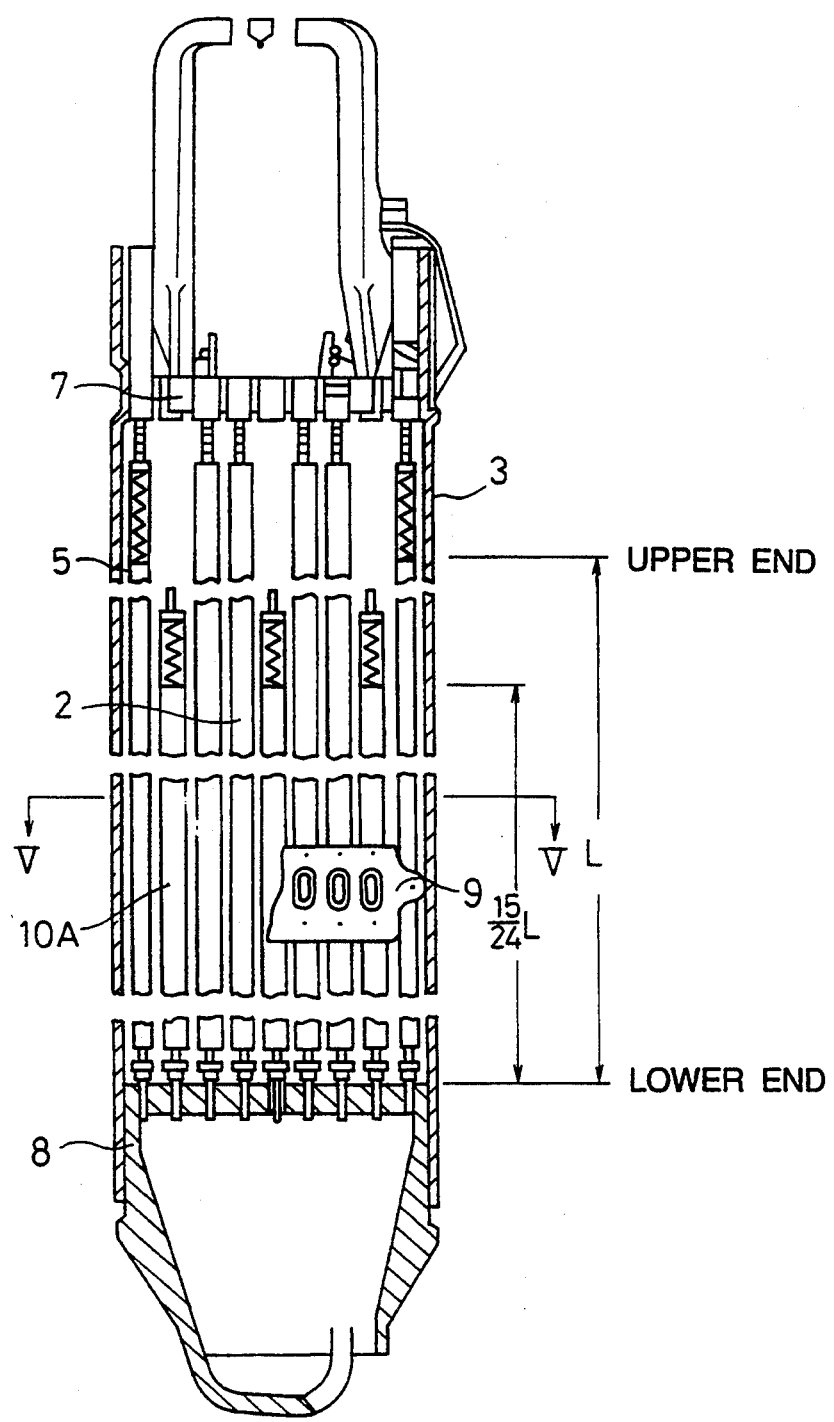
FIG. 6 is a sectional view, taken along line VI—VI, of the fuel assembly shown in FIG. 5.

A second embodiment of the present invention will now be described with reference to FIGS. 5 and 6. In this embodiment, partial length fuel rods 10 are included in the fuel assembly of the first embodiment shown in FIG. 1. The partial length fuel rods 10 are positioned, as shown in FIG. 5, at corners and middles of four sides of a second layer counting from the outermost layer of the fuel rod array in a square lattice pattern. The second fuel rods 4, 5 positioned at and adjacent to the corners of the channel box 3 are adjacent to those ones 10A of the partial length fuel rods 10 which are positioned at the corners. As shown in FIG. 6, a fuel effective length of the partial fuel rods 10A is 15/24 of a fuel effective length L of the first fuel rods 2 and the second fuel rods 4, 5 all of which have an ordinary length.

With this embodiment, since the moderator region 6 is enlarged above upper ends of the partial length fuel rods 10A in the fuel assembly in the axial direction, it is possible to intensify thermal neutron flux not only around the first fuel rods 2A, 2B adjacent to the second fuel rods 4, 5, but also around other first fuel rods 2C adjacent to the partial fuel rods 10A, so that the power of the first fuel rods 2A, 2C can be increased. As a result, a share of the power to be borne by the second fuel rods 4, 5 arranged at the corners can be reduced more, which enables a still further reduction in the power of those fuel rods.

Further, with this embodiment, since the moderator region 6 is greater than that in the above first embodiment, change in a void fraction averaged throughout the core gives rise to smaller change in a ratio of the number of hydrogen atoms to the number of uranium atoms (i.e., an H/U ratio) at the corners and reactivity variations due to change in the void fraction, i.e., an absolute value of a void coefficient, are reduced. Therefore, core stability and a reactor core shutdown margin under the cold condition are improved.

Figure 7:
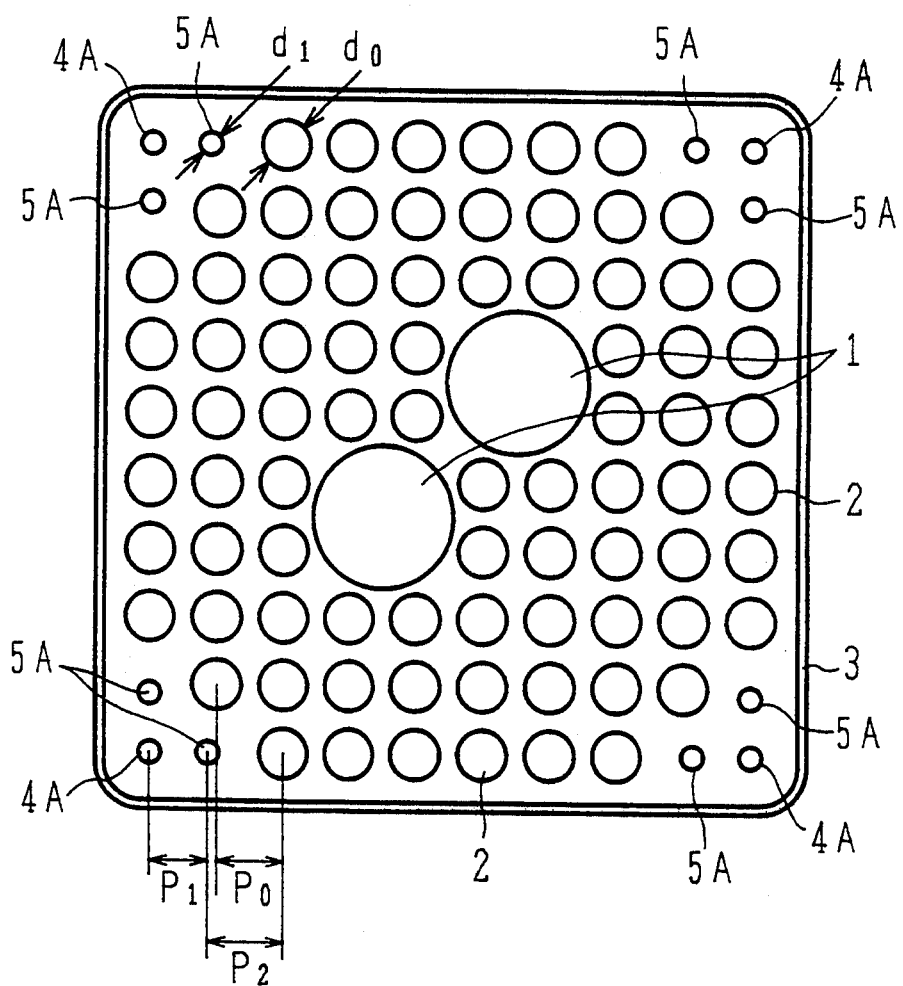
FIG. 7 is a horizontal sectional view of a fuel assembly in which the number of fuel lattice cells is 10×10, according to a third embodiment of the present invention.

A third embodiment of the present invention will now be described with reference to FIG. 7. This embodiment represents a case where the present invention is applied to a fuel assembly having a fuel lattice of 10×10 cells. In this embodiment, second fuel rods 4A positioned at corners of the channel box 3 and second fuel rods 5A, 5A adjacent to the former have an outer diameter and a pitch meeting the relationships of $d_1 < d_0$ and $P_1 < P_0 < P_2$, similarly to the above first embodiment.

Also when the number of fuel lattice cells is increased, those fuel rods which exhibit locally increased power are, particularly, twelve second fuel rods 4A, 5A positioned at and adjacent to the corners of the channel box 3. Accordingly, by setting the outer diameter and the pitch of those twelve second fuel rods 4A, 5A as mentioned above, this embodiment can also provide similar advantages to those of the above first embodiment.

A fourth embodiment of the present invention will now be described with reference to FIGS. 8 to 10. This embodiment is made in consideration of the case of loading a fuel assembly in a D-type lattice core that a gap water area on the side where a cross-sectioned control rod is inserted is greater than that on the side where no cross-sectioned control rod is inserted.

Figure 8:
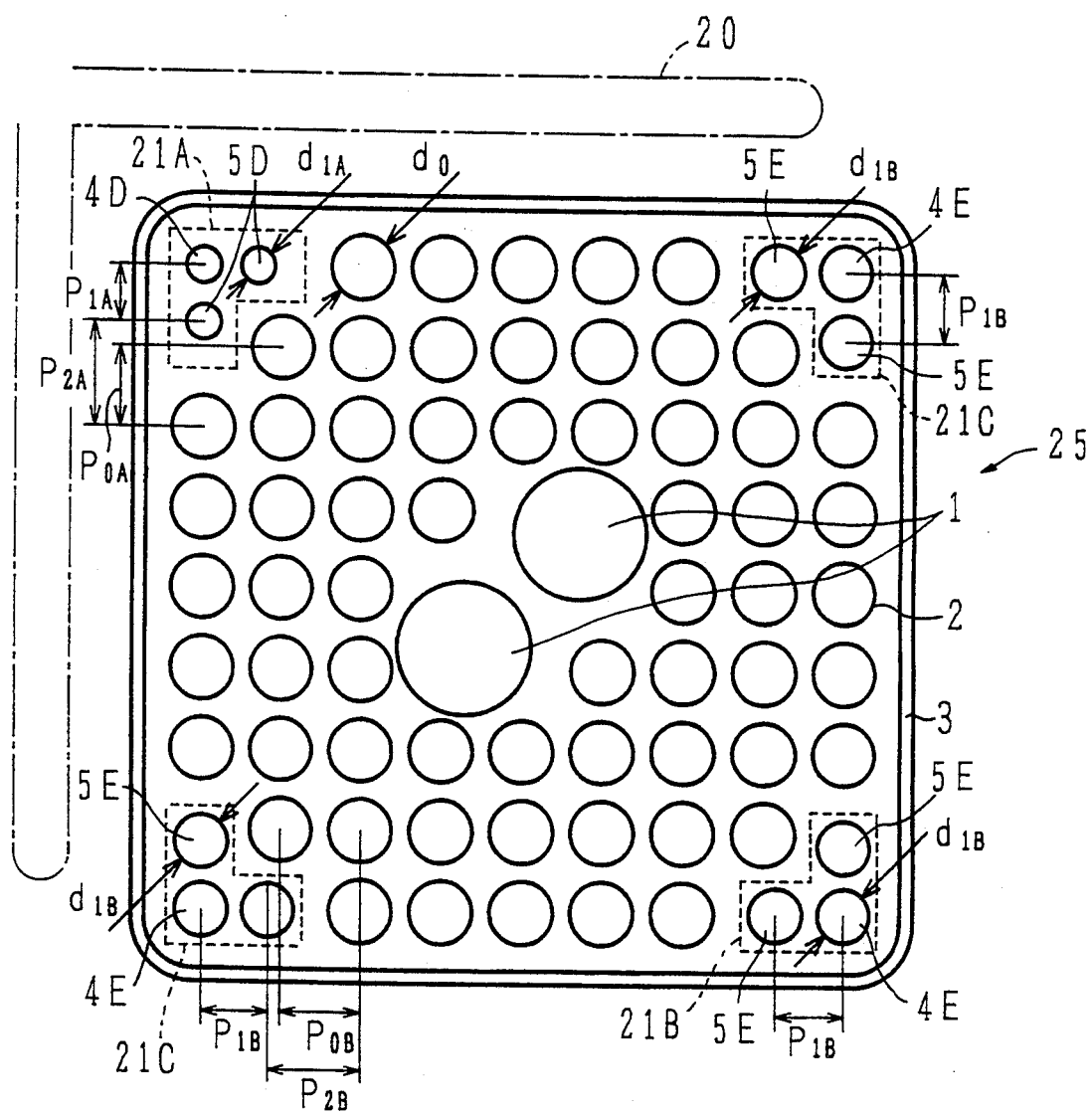
FIG. 8 is a horizontal sectional view of a fuel assembly which is loaded in a D-type lattice core, according to a fourth embodiment of the present invention.

In FIG. 8, denoted by 20 is a cross-sectioned control rod which can be inserted adjacently to a fuel assembly 25 of this embodiment. In a region 21A adjacent to the corner of the channel box 3 on the side of the fuel assembly 25 where the cross-sectioned control rod 20 is inserted, a second fuel rod 4D positioned at the corner of the channel box 3 and second fuel rods 5D, 5D adjacent to the former are related in outer diameter and pitch to the first fuel rods 2 to meet the relationships of $d_{1A} < d_0$ and $P_{1A} < P_{0A} < P_{2A}$, as with the above first embodiment. Further, in a region 21B adjacent to the corner of the channel box 3 on the side where the cross-sectioned control rod 20 is not inserted and in regions 21C adjacent to the corners of the channel box 3 between the side where the cross-sectioned control rod 20 is inserted and the side where the cross-sectioned control rod 20 is not inserted, second fuel rods 4E positioned at the corners of the channel box 3 and second fuel rods 5E, 5E adjacent to the former are also related in outer diameter and pitch to the first fuel rods 2 to meet the relationships of $d_{1B} < d_0$ and $P_{1B} < P_{0B} < P_{2B}$. In addition, the outer diameter $d_{1A}$ of the second fuel rods 4D, 5D in the corner region 21A on the side where the cross-sectioned control rod 20 is inserted is smaller than the outer diameter $d_{1B}$ of the second fuel rods 4E, 5E in the corner region $2_{1B}$ on the side where the cross-sectioned control rod 20 is not inserted (i.e., $d_{1A} < d_{1B} < d_0$), and the pitch $P_{1A}$ of the second fuel rods 4D, 5D in the corner region 21A is smaller than the pitch $P_{1B}$ of the second fuel rods 4E, 5E in the corner region 21B (i.e., $P_{1A} < P_{1B}$).

In the D-type lattice core, since the effect of moderating neutrons generated by nuclear fissions is different due to a difference in area of the gap water region formed outside the channel box 3, the thermal neutron flux has different levels. Taking into account that the side where the control rod is inserted exhibits a greater moderating effect and a higher level of the thermal neutron flux, in this embodiment, the second fuel rods 4D, 5D on the side where the control rod is inserted have the smaller outer diameter and pitch. Note that, in this embodiment, the second fuel rods 4E, 5E in the corner regions 21C between the side where the cross-sectioned control rod 20 is inserted and the side where the cross-sectioned control rod 20 is not inserted have the same outer diameter and pitch as those of the second fuel rods 4E, 5E in the corner region 21B on the side where the cross-sectioned control rod 20 is not inserted.

Figure 9:
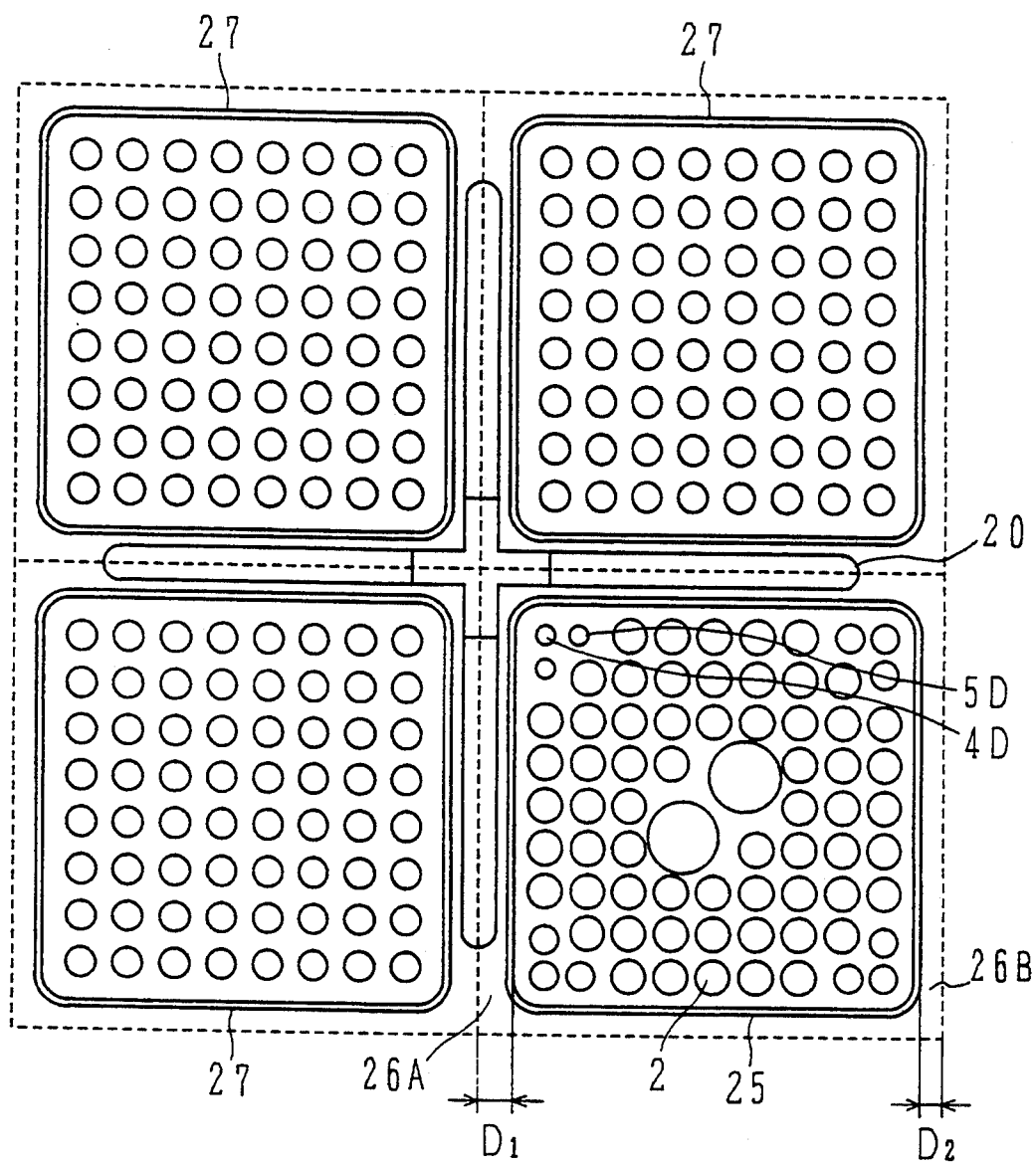
FIG. 9 is a view for explaining a manner of loading the fuel assembly shown in FIG. 8, the view showing the state of a transition core in which one of four fuel assemblies has been replaced by a fuel assembly of the fourth embodiment.
Figure 10:
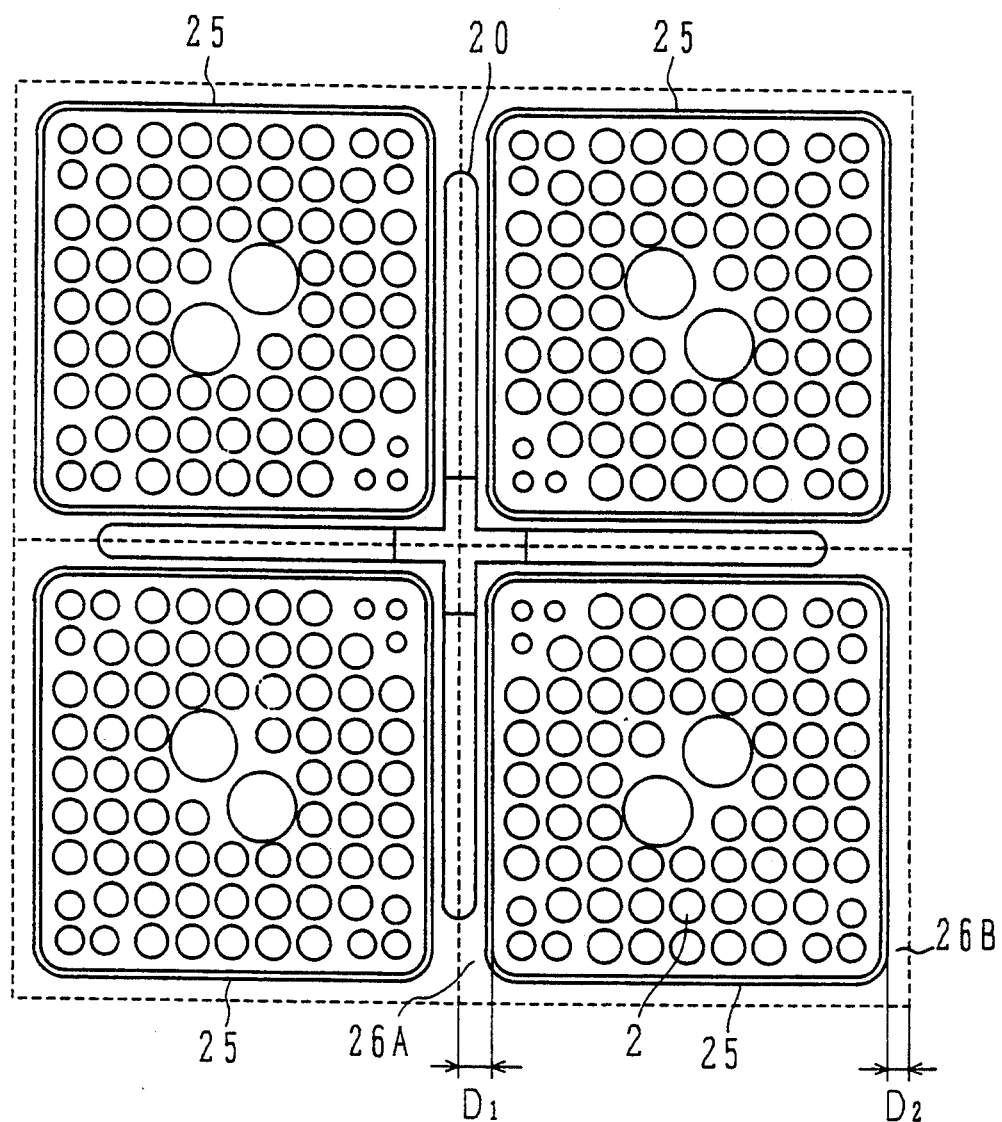
FIG. 10 is a view for explaining a manner of loading the fuel assembly shown in FIG. 8, the view showing the state of an equilibrium core in which four fuel assemblies have been all replaced by fuel assemblies of the fourth embodiment.

For explaining a manner of loading the fuel assembly of this embodiment into the D-type lattice core, FIGS. 9 and 10 show a part of sectional view of core after the loading, respectively. In these figures, the fuel assembly of this embodiment is denoted by 25 and a conventional fuel assembly is denoted by 27. The core is arranged such that four fuel assemblies are loaded around the cross-sectioned control rod 20 to constitute one fuel unit. Specifically, FIG. 9 shows the state of a transition core in which one of the four fuel assemblies has been replaced by the fuel assembly 25 of this embodiment. FIG. 10 shows the state of an equilibrium core in which the four fuel assemblies have been all replaced by the fuel assemblies 25 of this embodiment.

In the D-type lattice core, as shown, a gap water area 26A on the side where the cross-sectioned control rod 20 is inserted has a larger area than that of a gap water area 26B on the side where the cross-sectioned control rod 20 is not inserted. Thus, assuming that the gap water area 26A has a width $D_1$ and the gap water area 26B has a width $D_2$, the relationship of $D_1 < D_2$ holds. When the fuel assembly 25 of this embodiment is applied to such a D-type lattice core, that corner of the fuel assembly 25 at which the thinnest fuel rods 4D, 5D among the fuel rods having the smaller outer diameter than the ordinary fuel rods 2 is arranged to be nearest to the center of the cross-sectioned control rod 20.

In addition to the similar advantages to those of the above first embodiment, this embodiment can present another advantage that since the fuel rods in the corner regions are formed and arranged to have their outer diameters and pitches meeting the relationships of $d_{1A} < d_{1B} < d_0$ and $P_{1A} < P_{1B}$, it is possible to compensate for the difference in gap water area between the side where the cross-sectioned control rod 20 is inserted and the side where it is not inserted, whereby the local power peaking factor is flattened more.

Figure 11:
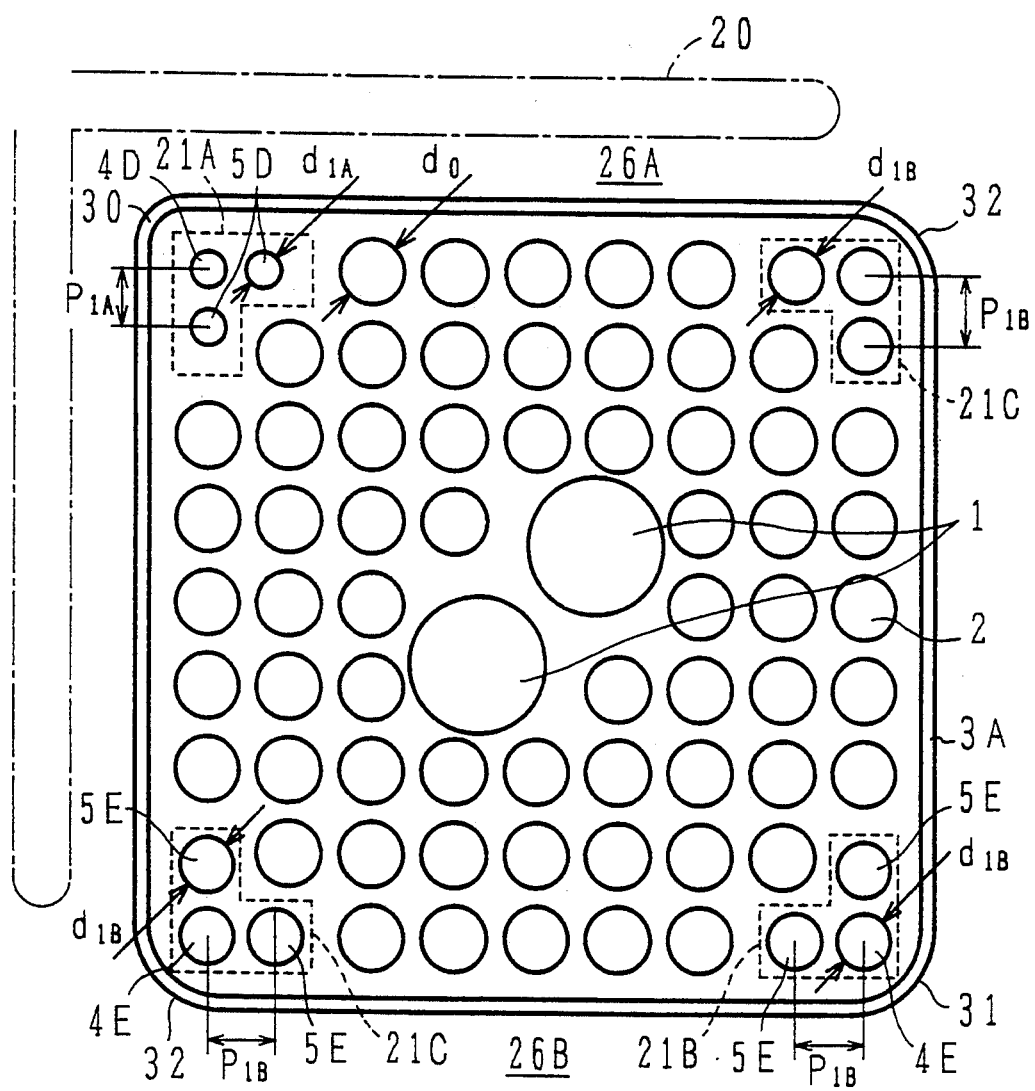
FIG. 11 is a horizontal sectional view of a fuel assembly in which corners of a channel box have different curvatures, according to a fifth embodiment of the present invention.

A fifth embodiment of the present invention will now be described with reference to FIG. 11. This embodiment is also intended for loading the fuel assembly into a D-type lattice core similarly to the above fourth embodiment. In addition to the arrangement of the fourth embodiment, this embodiment is modified in that corners of a channel box 3A has different curvatures between the side where he cross-sectioned control rod 20 is inserted and the side where the cross-sectioned control rod 20 is not inserted, taking into account the difference in gap water area between the side where the cross-sectioned control rod 20 is inserted and the side where it is not inserted.

More specifically, in the D-type lattice core, the gap water area 26A on the side where the cross-sectioned control rod 20 is inserted has a larger area than that of the gap water area 26B on the side where the cross-sectioned control rod 20 is not inserted, as mentioned above. Therefore, a corner 30 of the channel box 3A on the side where the cross-sectioned control rod 20 is inserted is formed to have a larger curvature than that of the corners of the ordinary channel box 3 shown in FIG. 8, thereby reducing the area of the gap water area 26A. Also, a corner 31 of the channel box 3A on the side where the cross-sectioned control rod 20 is not inserted is formed to have a smaller curvature than that of the corners of the ordinary channel box 3 shown in FIG. 8, thereby increasing the area of the gap water area 26B. Note that, in this embodiment, corners 2 of the channel box 3A between the side where the cross-sectioned control rod 20 is inserted and the side where the cross-sectioned control rod 20 is not inserted have the same curvature as that of the corners of the ordinary channel box 3 shown in FIG. 8.

With this embodiment, since the corners of the channel box are changed in curvature so as to adjust distribution of the moderator at different corners of the fuel assembly, it is possible to compensate for the difference in gap water area between the side where the cross-sectioned control rod is inserted and the side where it is not inserted, whereby the local power peaking factor is flattened still more.

Figure 12:
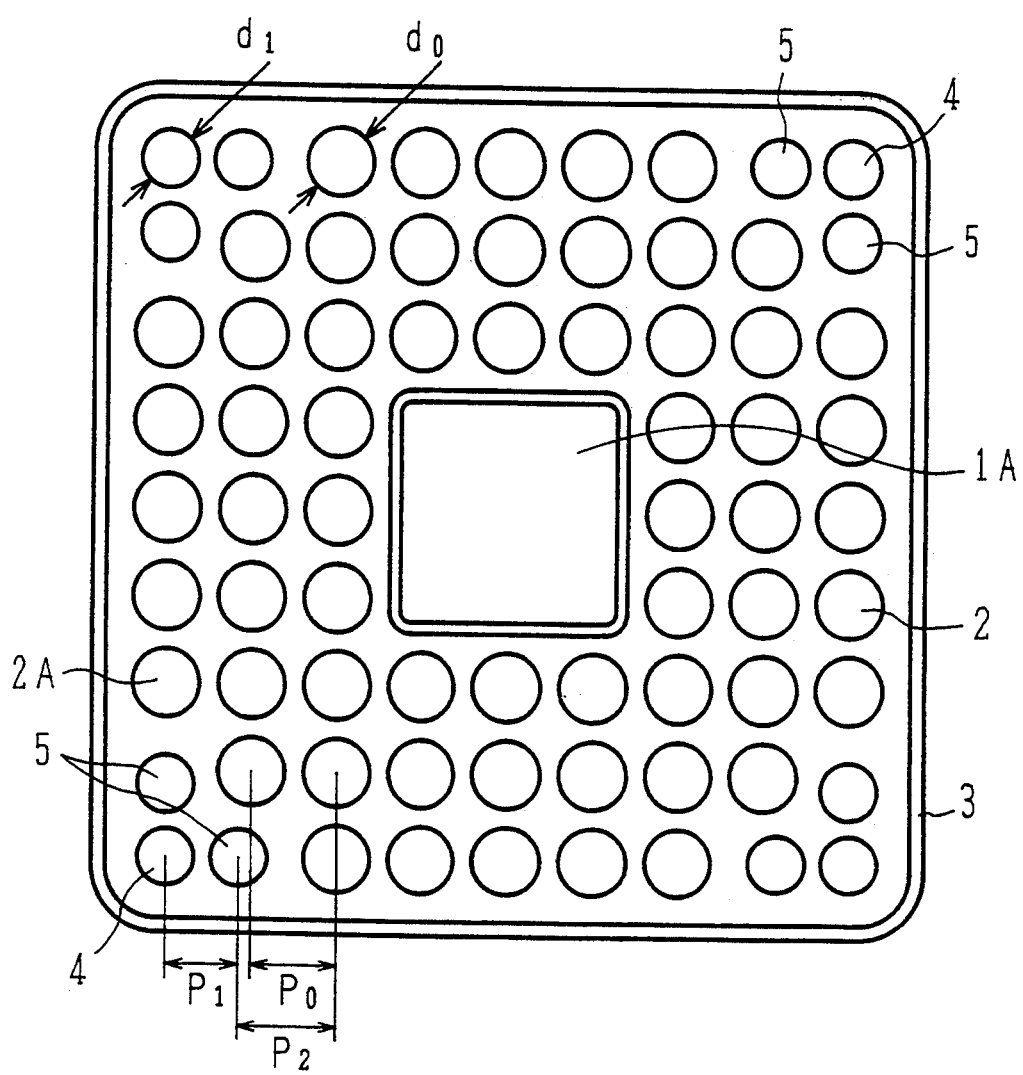
FIG. 12 is a horizontal sectional view of a fuel assembly which employs a single large-size water rod, according to a sixth embodiment of the present invention.

A sixth embodiment of the present invention will now be described with reference to FIG. 12. This embodiment is different from the above first embodiment shown in FIG. 1 in that a single large-size water rod 1A occupying a space able to accommodate nine unit cells of square lattice is used instead of the two water rods 1. With this embodiment, since the number of those ordinary fuel rods 2 which are adjacent to the square large-size water rod 1A is increased two, i.e., from 10 to 12, in comparison with the first embodiment and the water rod area is enlarged, the neutron moderating effect by the water rod is increased. Therefore, the local power peaking factor of the fuel assembly is further flattened.

According to the present invention, as will be apparent from the above description, it is possible to realize a fuel assembly intended for higher burn-up since enrichment can be increased while suppressing an increase in the local power peaking factor at corners of the fuel assembly.

What is claimed is:

1. A fuel assembly comprising a plurality of first fuel rods arrayed in a square lattice pattern and containing nuclear fuel material, and at least one moderator rod containing no nuclear fuel materials, wherein:

said fuel assembly further comprises a plurality of second fuel rods having a smaller outer diameter than an outer diameter of said first fuel rods, said second fuel rods are arranged at corners of an outermost layer of the fuel rod array and at positions adjacent to the corners of said outermost layer, and a pitch between said second fuel rods is narrower than a pitch between said first fuel rods.

2. A fuel assembly according to claim 1, wherein a pitch between those ones of said second fuel rods arranged at positions adjacent to the corners of said outermost layer and said first fuel rods arranged in said outermost layer adjacently to those said second fuel rods is wider than the pitch between said first fuel rods.

3. A fuel assembly according to claim 1, wherein a spacing between outer circumferential surfaces of said second fuel rods is almost equal to a spacing between outer circumferential surfaces of said first fuel rods.

4. A fuel assembly according to claim 1, wherein a plurality of said first fuel rods include a plurality of ordinary fuel rods and a plurality of partial length fuel rods having a shorter fuel effective length than a fuel effective length of said ordinary fuel rods, and said partial length fuel rods are arranged at corners of an layer just inwardly of said outermost layer.

5. A fuel assembly according to claim 1, wherein of said second fuel rods arranged at the corners of said outermost layer of the fuel rod array and at the positions adjacent to the corners of said outermost layer, an outer diameter of and a pitch between those second fuel rods arranged at a particular corner and positions adjacent to said particular corner are smaller than an outer diameter of and a pitch between those second fuel rods arranged at other corners and positions adjacent to said other corners.

6. A fuel assembly according to claim 5, further comprising a channel box enclosing said first and second fuel rods and said moderator rod, wherein corners of said channel box adjacent to said other corners have a smaller curvature than a curvature of a corner of said channel box adjacent to said particular corner.

7. A fuel assembly according to claim 5 or 6, wherein when said fuel assembly is loaded in a core of the type that a control rod is inserted adjacently to said fuel assembly, said particular corner is positioned on the side where said control rod is inserted.

8. A reactor core containing a plurality of fuel assemblies, wherein at least one of said plural fuel assemblies comprises a plurality of first fuel rods arrayed in a square lattice pattern and containing nuclear fuel material, at least one moderator rod containing no nuclear fuel materials, and a plurality of second fuel rods having a smaller outer diameter than an outer diameter of said first fuel rods, said second fuel rods are arranged at corners of an outermost layer of the fuel rod array and at positions adjacent to the corners of said outermost layer, and a pitch between said second fuel rods is narrower than a pitch between said first fuel rods.

9. A reactor core according to claim 8, further comprising a control rod capable of being inserted adjacently to at least one said fuel assembly, wherein of said second fuel rods arranged at the corners of said outermost layer of the fuel rod array and at the positions adjacent to the corners of said outermost layer, an outer diameter of and a pitch between those second fuel rods arranged at one corner on the side where said control rod is inserted and positions adjacent to one said corner are smaller than an outer diameter of and a pitch between those second fuel rods arranged at another corner on the side where said control rod is not inserted and positions adjacent to said another corner.

10. A reactor core according to claim 9, at least one said fuel assembly further comprises a channel box enclosing said first and second fuel rods and said moderator rod, wherein a corner of said channel box adjacent to said another corner on the side where said control rod is not inserted has a smaller curvature than a curvature of a corner of said channel box adjacent to one said corner on the side where said control rod is inserted.

* * * * *